United States Patent Office 2,827,707
Patented Mar. 25, 1958

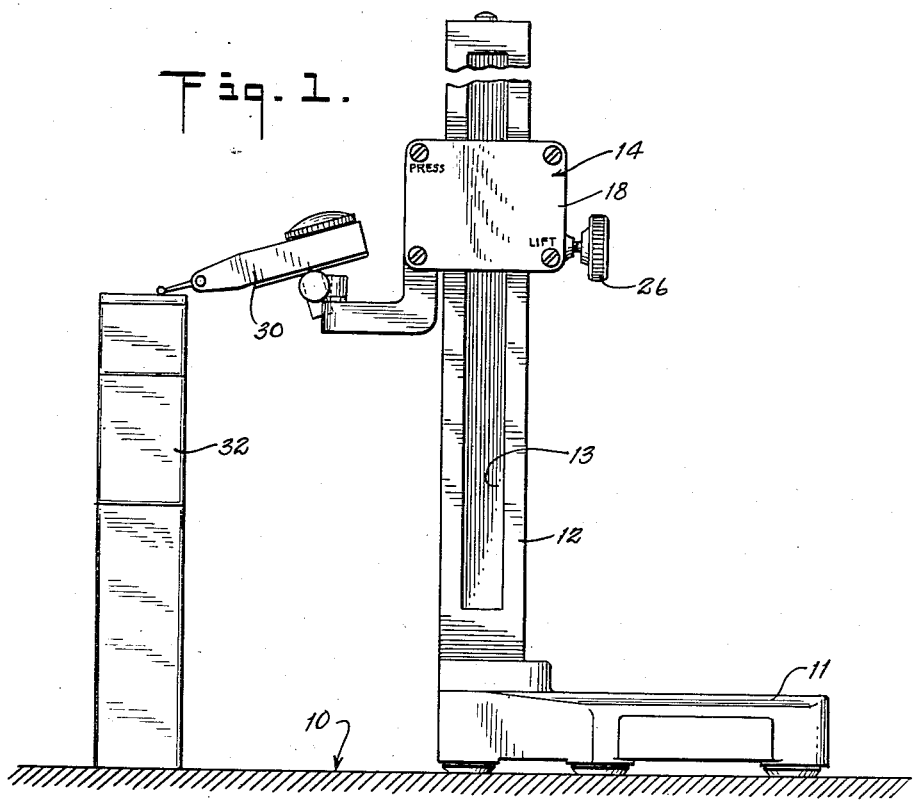
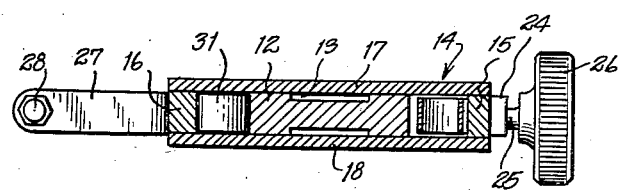
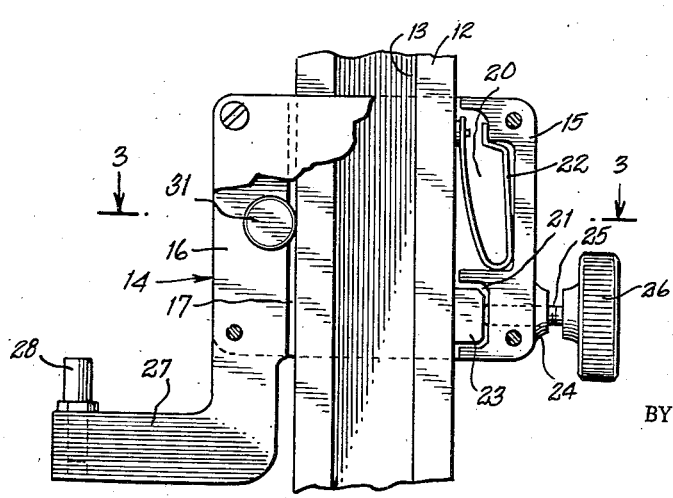

2,827,707

HEIGHT COMPARATOR GAGE

Walter J. Croshier, Hyde Park, and John Klink, Pine Plains, N. Y., assignors to Standard Gage Company, Inc., Poughkeepsie, N. Y., a corporation of New York Application March 15, 1957, Serial No. 646,348

9 Claims. (Cl. 33—169)

The present invention relates to height comparator gages and particularly for a gage adapted for use with a surface plate and which readily compares the height above the surface plate of any object with a standard height obtained through the use of gage blocks of the Johansson, Hoke or other known types.

The older forms of height gages are of two types, one of which measures height directly through the use of graduations on a vertical stand usually coupled with a vernier arrangement to give a micrometer adjustment. The second type in common use utilizes a dial indicator and is of the comparator type to provide means for locking the vertically adjustable element which supports the dial gage rigidly in position which means has to be unlocked before the gage can be readjusted.

Our invention provides a height comparator gage so arranged that the dial indicator and the slide member which supports it on the vertical element are movable as a unit without the necessity of locking and unlocking while at the same time providing fine adjustment in a simple and easy to operate manner.

It is an object of the invention to provide a height comparator gage having the usual stand including a vertical rod or shaft on which a slide member is mounted with means incorporated in the slide member rendering it readily adjusted on the vertical rod and likewise readily rocked with respect to the rod to provide for fine adjustment.

It is another object of the invention to provide such a slide element, in which the mechanism which permits the slide to be easily moved longitudinally of the supporting rod and readily rocked with respect thereto, is simple and provided with few moving parts.

It is a further object of the invention to provide a height comparator gage having a mode of fine adjustment of the dial indicator and of the slide which supports that dial indicator which permits of fine adjustment over a considerable range.

Other objects and features of the invention will be apparent when the following description is considered in connection with the annexed drawings, in which, Figure 1 is a side elevational view of the height comparator gage of our invention showing it being set to a stack of gage blocks;

Figure 2 is a fragmentary view of the gage of Figure 1 showing particularly the slider member and the mode of mounting this member for vertical movement along the supporting rod; and Figure 3 is a transverse cross-sectional view of the slider member and the supporting rod, the view being taken on the plane of the line 3—3 of Figure 2.

Referring now to the drawings, there is shown at 10 a flat surface such, for example, as the usual surface plate. Placed upon this surface is the height comparator gage of our invention which comprises a base 11 having a rod 12 which, in this instance, is rectangular in cross-section, rigidly fixed thereto, the rod 12 extending generally vertically. In order to reduce friction between the slide member later to be described and the supporting rod 12, the rod 12 is provided with depressions in its sides so that the slider bears against the outer margins of the side portions only.

Mounted upon the vertically extending rod 12 for sliding movement is the slider member 14 which comprises two members 15 and 16 joined by the side plates 17 and 18.

The member 15 is shown in Figure 2 and comprises a generally rectangular casting having two cavities 20 and 21 formed therein. Mounted in the cavity 20 is a leaf spring 22 having a generally U shape. This spring is provided with a nylon button at its upper left hand end, this button having a shank which extends into an aperture formed in the spring and bearing against the adjacent edge of the supporting rod 12.

Mounted in the second cavity 21 is a small rectangular block 23, the left hand surface of which bears against the adjacent edge of the supporting rod 12. Threadedly mounted in a boss 24 of the member 15 is a screw 25 which extends into the cavity 21 and bears against the right hand surface of the block 23. Screw 25 is provided with a knurled head 26 so that it may be readily operated.

The left hand member 16 of the slide 14 is formed in a generally L shape, the lower horizontal arc 27 of the L being provided with a stud 28 which serves as a mounting for a dial gage of usual type shown in Figure 1 and designated 30.

Mounted in an aperture adjacent the inner edge of the vertical portion of member 16 is a cylindrical plug-like member 31 which is preferably made of oil impregnated bronze although it may be made of steel or other material.

As will now be seen, the slider 14 may be moved upwardly by exerting pressure upon the lower edge of member 15. This pressure will cause the entire slider to rock about the plug 31 as a pivot and will therefore free the block 23 from engagement with the adjacent side of the rod 12. In a similar manner the slider may be adjusted in the downward direction by simply pressing against the upper edge of member 16 which will again rock the entire slider about the plug 31 in the same counterclockwise direction freeing it for movement downwardly. The slider will, however, be locked rigidly in its adjusted position because the spring exerts a pressure rocking the slider 14 about the plug 31 in a clockwise direction thus causing the block 23 to frictionally engage the adjacent edge of the rod 12.

In order to effect fine adjustment of the position of the dial indicator gage 30, the screw 25 is operated thereby altering the angular position of the entire slider with respect to the vertical rod 12. Due to the extension 27 of member 16 it will be obvious that relatively small angular movements produce relatively great movements of the left end of the horizontal portion 27 of member 16 and thus make it possible to adjust the gage 30 over a large range of movement while at the same time enabling this adjustment to be made with considerable precision due to the fact that the pitch of the thread of screw 25 is small.

The slider 14 is retained on the rod 12 by use of screw 32 the head of which is large and overlies the side plates 17 and 18 of slider 14.

The mode of utilizing the gage is obvious from the preceding description. However, it will be described briefly at this time. A stack of Johansson blocks, indicated in Figure 1 at 32, is placed upon the surface plate 10 and the gage of our invention is likewise placed upon that plate. The slide 14 is moved to a position such that the gage is well above the level of the top block of the stack 32 and the height comparator gage is moved as a unit so that the measuring tip of the dial indicator 32 is above the stack of blocks. Thereafter, the slide 14 is moved downwardly by exerting pressure on the upper left hand corner thereof, i. e. upon the upper edge of member 16, until the measuring tip engages the top surface of the stack of blocks. Thereafter the knurled knob 26 of screw 25 is adjusted in either direction until the dial indicator is set to a zero reading.

The height gage is now set to the desired reading and the height of any object above the surface plate 19 may be determined by placing the object upon the plate and beneath the measuring tip of gage 30 which will then indicate the deviation from the set measurement in either the positive or negative direction.

While a preferred embodiment of our invention has been described, it will be understood that we wish to be limited not by the foregoing description, but solely by the claims granted to us.

What is claimed is:

1. In a height comparator gage having a base adapted to be placed on a surface plate, a vertical rod and a gage supporting slider mounted on the rod; the improvement which comprises rocker means in said slider bearing against an edge of the rod, spring means mounted in the slider and bearing against the opposite edge of the rod above the bearing point of said rocker means and adjusting means mounted in said slider and bearing against said opposite edge of the rod below the bearing point of said rocker means whereby said slider may be moved along the rod by pressure on said slider rocking it about said rocker means against the urge of said spring and adjusted by said adjusting means.

2. A height comparator gage according to claim 1, wherein said slider comprises an L-shaped member, the horizontal portion of which supports a gage and the vertical portion of which extends generally parallel to the rod and wherein said rocker means is mounted in said vertical element.

3. A height comparator gage according to claim 2, wherein said rocker means is a cylindrical plug and said vertical portion of said L-shaped member has a cylindrical aperture adjacent the edge of the rod with the periphery intersecting the adjacent edge of the vertical portion and said plug is mounted in said aperture.

4. A height comparator gage according to claim 1, wherein said slider comprises a portion having cavities therein adjacent said rod and wherein said spring means is mounted in a first one of said cavities with one end thereof exerting pressure against said rod.

5. A height comparator gage according to claim 1, wherein said slider comprises a portion having cavities therein adjacent the rod and said adjusting means is mounted in a second one of said cavities and includes means to rockably adjust the slider relative to the rod.

6. A height comparator gage according to claim 5, wherein said adjusting means is a block in said second cavity and a screw extends through the wall of said slider and adjusts the position of said block relative to the edge of the rod.

7. A height comparator gage according to claim 1, wherein said slider comprises an L-shaped member, the horizontal portion of which supports a gage and the vertical portion of which extends generally parallel to the rod and wherein said rocker means is mounted in said vertical element, and wherein said slider additionally comprises a portion having cavities therein adjacent said rod and wherein said spring means is mounted in a first one of said cavities with one end thereof exerting pressure against said rod.

8. A height comparator gage according to claim 2, wherein said rocker means is a cylindrical plug and said vertical portion of said L-shaped member has a cylindrical aperture adjacent the edge of the rod with the periphery intersecting the adjacent edge of the vertical portion and said plug is mounted in said aperture, and wherein said slider comprises a portion having cavities therein adjacent said rod and wherein said spring means is mounted in a first one of said cavities with one end thereof exerting pressure against said rod, and wherein said slider additionally comprises a portion having cavities therein adjacent the rod and said adjusting means is mounted in a second one of said cavities and includes means to rockably adjust the slider relative to the rod.

9. A height comparator gage according to claim 2, wherein said rocker means is a cylindrical plug and said vertical portion of said L-shaped member has a cylindrical aperture adjacent the edge of the rod with the periphery intersecting the adjacent edge of the vertical portion and said plug is mounted in said aperture, and wherein said slider comprises a portion having cavities therein adjacent said rod and wherein said spring means is mounted in a first one of said cavities with one end thereof exerting pressure against said rod, and wherein said adjusting means is a block in said second cavity and a screw extends through the wall of said slider and adjusts the position of said block relative to the edge of the rod.

No references cited.